(12) United States Patent
Marola

(10) Patent No.: US 7,156,591 B2
(45) Date of Patent: Jan. 2, 2007

(54) HIGH MOBILITY RECOVERY TRAILER

(75) Inventor: Martin A. Marola, Goshen, CT (US)

(73) Assignee: Tru-Hitch, Inc., Barkhamsted, CT (US)

( * ) Notice: Subject to any disclaimer, the term of this patent is extended or adjusted under 35 U.S.C. 154(b) by 116 days.

(21) Appl. No.: 10/971,168

(22) Filed: Oct. 22, 2004

(65) Prior Publication Data

US 2006/0087099 A1   Apr. 27, 2006

(51) Int. Cl.
*B60P 3/06*   (2006.01)

(52) U.S. Cl. ...................................................... 410/23

(58) Field of Classification Search ................. 410/23, 410/3, 4, 44, 45
See application file for complete search history.

(56) References Cited

U.S. PATENT DOCUMENTS

| | | | | |
|---|---|---|---|---|
| 3,698,582 A * | 10/1972 | Weinmann | ................... | 414/481 |
| 3,866,947 A * | 2/1975 | Yakubow | ................. | 280/441.2 |
| 4,367,884 A * | 1/1983 | Johnson et al. | .......... | 280/441.2 |
| 4,400,005 A * | 8/1983 | Losh | ........................ | 280/441.2 |
| 4,747,746 A * | 5/1988 | Wise | ........................... | 414/481 |
| 4,806,065 A * | 2/1989 | Holt et al. | ................... | 414/481 |
| 4,903,976 A * | 2/1990 | Baillie | ........................ | 280/426 |
| 5,601,303 A * | 2/1997 | Underwood | ............. | 280/414.5 |
| 6,224,082 B1 * | 5/2001 | Landoll et al. | .......... | 280/425.2 |
| 6,932,372 B1 * | 8/2005 | French et al. | ............ | 280/417.1 |
| 6,957,822 B1 * | 10/2005 | Douglas et al. | .......... | 280/416.1 |

* cited by examiner

*Primary Examiner*—H Gutman
(74) *Attorney, Agent, or Firm*—Alix, Yale & Ristas, LLP

(57) ABSTRACT

The invention in a preferred form includes a frame assembly having a load bearing surface and a hitch engagement. The hitch engagement includes a lifting bar and a hitch guide. A bogey assembly may be further attached to the frame. The bogey assembly may include a wheeled axle. The high mobility trailer includes a frame having a pair of transversely spaced rails. The frame has a forward portion and a rearward portion and includes a hitch engagement having a lifting bar selectively fixed to the forward portion of the rails. The lifting bar is selectively movable between an up-position and a down-position. The frame further includes a cross beam fixed to the rails at a position rearward from the lifting bar. The cross beam has a hitch leg guide.

19 Claims, 10 Drawing Sheets

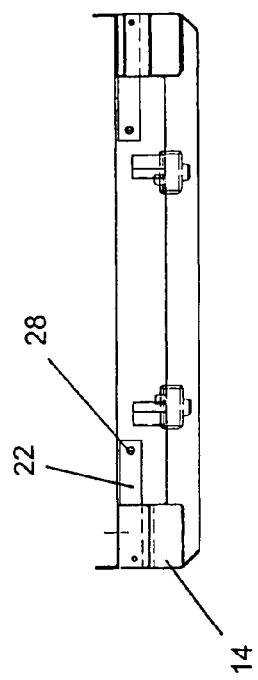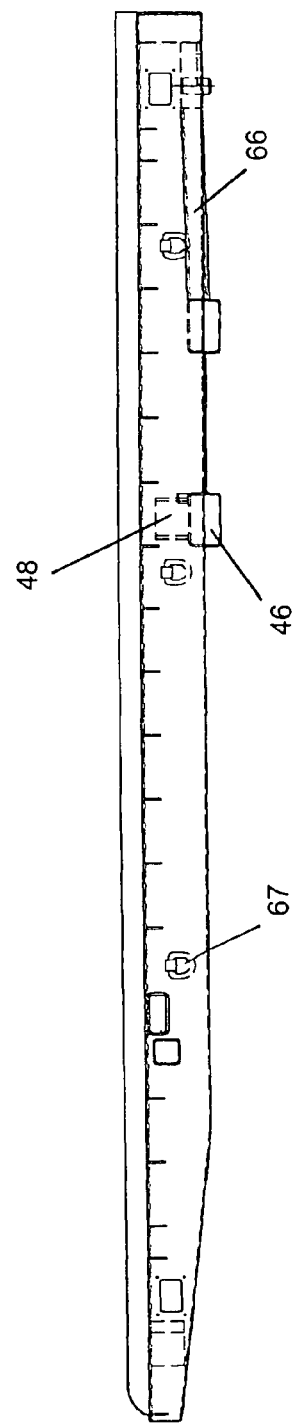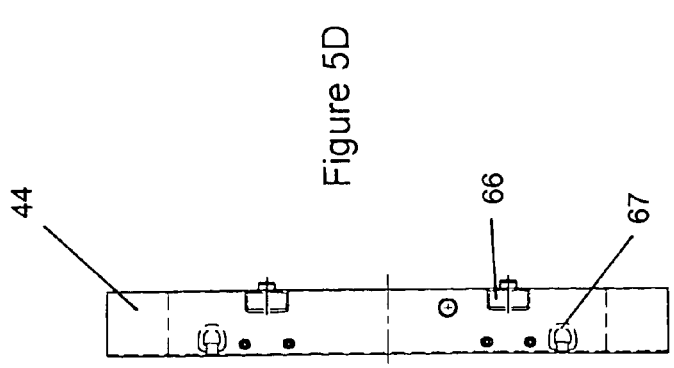

HIGH MOBILITY RECOVERY TRAILER

FIELD OF THE INVENTION

The present invention generally relates to vehicle trailers. In particular, the invention relates to heavy equipment recovery trailers having high mobility characteristics.

BACKGROUND OF THE INVENTION

Heavy equipment is a central part of both civilian and military operations. Typically this equipment includes such things as bulldozers, excavators, tanks, armored personnel carriers, self-propelled artillery, cranes, dump trucks, and other equipment often weighing several tons. Generally, this heavy equipment is self-propelled and moves over the ground via such things as wheels or treads. However, the heavy equipment is typically limited to traveling at slow to medium speeds, and/or may be of a weight or configuration that operation of the equipment on conventional roadways can substantially damage the roadway. For example, steel treads are well known in their ability to deform and/or fracture asphalt and concrete roadways. Furthermore, the heavy equipment is often normally operated in locations which are remote to finished roadways. For example, both civilian and military equipment may be operated in woodland, desert, tundra, and beach environments.

While being operated, heavy equipment is often damaged or suffers from various system failures that require that it be transported from its operational environment to a repair facility. Heavy equipment may also be required to be moved between operational environments hundreds or thousands of miles apart. Trailer and tractor truck combinations are often utilized to transport the heavy equipment from one location to another. Conventionally, the trailers are attached by a fifth wheel hitch to the tractor truck. These conventional trailers utilize such things as ramps that allow the heavy equipment to either be driven onto the trailer or to be winched/pushed up onto the trailer. However, these conventional trailers have several drawbacks. Typically, these trailers are constructed such that they have minimal ground clearance. This minimal ground clearance severely limits their use in off road operational environments since the trailer may strike obstacles or become high-centered.

In addition, conventional trailers often require a complete fifth wheel hitch assembly; in particular, the hitch assembly requires all the functional components which allow it to be connected to the fifth wheel hitch of a tractor truck. This results in trailers being extremely heavy and may inhibit deployment of the trailer into, for example, military operational areas by a cargo plane. In addition, conventional trailers cannot be reconfigured efficiently, thereby requiring a specific trailer to be utilized with a specific class of heavy equipment.

Furthermore, these conventional trailers also present an obstacle to easily loading the heavy equipment for the simple fact that the ramps, in order to be efficiently included, are typically of a short length. The short length results in a relatively steep angle when the ramps are deployed. The steep angle of the deployed ramps is difficult for heavy equipment to negotiate in reaching the trailer transport surface. This is especially true in areas where the deployed ramps rest on soft or sandy ground since the ramps will sink into the ground during deployment and loading.

In addition, conventional trailers, while allowing operation on finished roadways, are typically not rugged enough to permit repeated operation in environments where heavy equipment is being operated. Typically, when heavy equipment must be moved to another location, it is operated under its own power to a location suitable for the trailer. However, when the equipment has malfunctioned, a retrieval vehicle, such as a tow truck or heavy equipment retriever, is needed to pull or push the heavy equipment to the location for trailer pick-up. This often results in long delays and high costs.

Furthermore, conventional trailers are often not suited for air transport. For example, conventional trailer tractor combinations typically have a ground clearance, length, weight, and/or other features which prevent the combination from being loaded into a cargo aircraft compartment, for example a C130 air transport.

Military operational areas additionally pose significant disadvantages and dangers to conventional trailers. For instance, military equipment is often transported through very rough terrain, and is often subjected to the effects of enemy weaponry such as mines, grenades, improvised explosives, and other ordinance. Conventional trailers generally have a deck on which the heavy equipment rests. This deck presents a substantially contiguous covering over the entire trailer surface. This type of closed deck presents a horizontal surface that encounters enormous forces from blasts and detonations. These forces may cause conventional trailers, in either their loaded or unloaded configuration, to be severely damaged and/or to be overturned.

SUMMARY OF THE INVENTION

Briefly stated, the invention in a preferred form includes a frame assembly having a load bearing surface and a hitch engagement. The hitch engagement includes a lifting bar and a hitch guide. A bogey assembly may be further attached to the frame. The bogey assembly may include a wheeled axle.

The high mobility trailer includes a frame having a pair of transversely spaced rails. The frame has a forward portion and a rearward portion and includes a hitch engagement having a lifting bar selectively coupled to the forward portion of the rails. The frame further includes a cross beam fixed to the rails at a position rearward from the lifting bar. The cross beam has a hitch leg guide. Depending on, for example, the load requirements the frame may be configured in various lengths.

An object of the present invention is to provide a recovery trailer having high mobility especially in operational areas where heavy equipment is used.

Another object of the invention is to provide a recovery trailer for heavy equipment which allows heavy equipment to be easily loaded.

A further object of the invention is to provide a recovery trailer for heavy equipment that is sufficiently rugged to withstand operation and collateral assaults associated with civilian and military environments.

BRIEF DESCRIPTION OF THE DRAWINGS

Other objects and advantages of the invention will be evident to one of ordinary skill in the art from the following detailed description made with reference to the accompanying drawings in which:

FIG. 5A shows a front view, partly in phantom, of a high mobility trailer frame lifting bar mount consistent with the present invention; and FIG. 5B shows a side view, partly in phantom, of a high mobility trailer frame consistent with the present invention;

FIG. 5D shows a side view from inside a perimeter of the trailer frame of a rear portion of a high mobility trailer frame consistent with the present invention;

DETAILED DESCRIPTION OF THE
PREFERRED EMBODIMENT

Figure 1A:
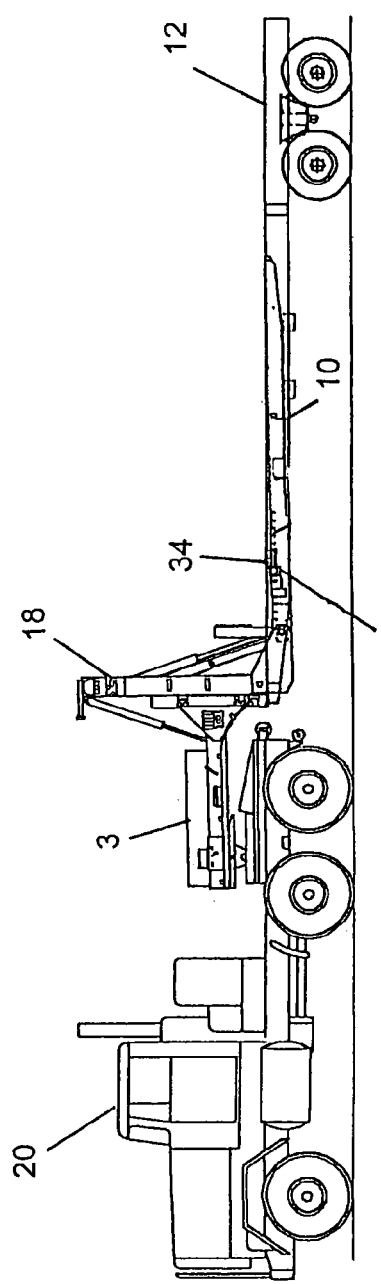
FIGS. 1A and 1B are side elevational views, partly in phantom, showing a truck and trailer assembly, consistent with the present invention, in both the assembled and loading configurations respectively.
Figure 1B:
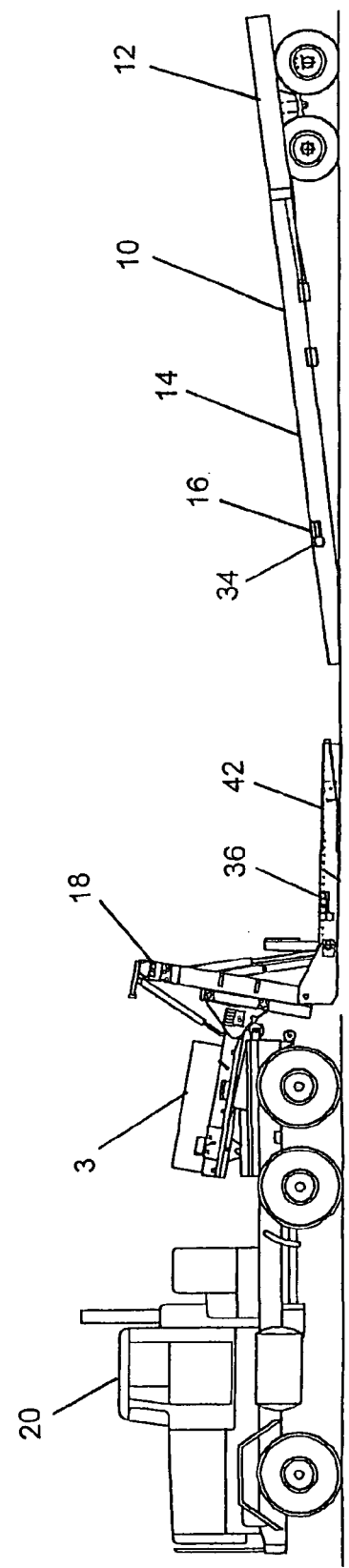

With reference to the drawings wherein like numeral represent like components throughout the figures, FIGS. 1A and 1B show a tractor in association with a trailer 10 in accordance with the present invention. The trailer 10 has a rugged heavy duty construction which is principally formed from steel. The trailer 10 has a rear bogey assembly 12 and a mainframe 14 with a lifting bar 16. The trailer 10 is configured to operatively engage with a hitch assembly 18 mounted on a tractor, for example, a tractor truck 20. The hitch assembly 18 may be identical to the boom assemblies disclosed in U.S. Pat. No. 5,249,911 and U.S. Pat. No. 5,163,803, both of which are fully incorporated by reference herein.

The trailer 10 may be disengaged from the hitch assembly 18 such that the trailer may be used as a ramp, as shown in FIG. 1B, onto which heavy equipment may be driven or winched. For example, the trailer may present, in one embodiment of the invention, a 7 degree load angle. In its disengaged configuration, the trailer may also serve as a loading ramp for loading platform trailers.

When operatively engaged with the hitch assembly 18, as shown in FIG. 1A, the hitch may adjusted in height and length (as discussed in U.S. Pat. No. 5,249,911 and U.S. Pat. No. 5,163,803) such that the ground clearance of the trailer is altered to allow for high mobility of the trailer. For example, the trailer may meet a Roll on/Roll off (RORO) loading ramp specification requirement of negotiating a 15 degree ramp incline without ramp support shoring and without portions of the trailer, except for such things as the trailer tires, contacting the surface of the ground, ramp, or cargo compartment floor. In addition, a minimum 1-in clearance between all components of the trailer and tractor assembly, excluding the tires, and the ground may be maintained. The trailer in one embodiment of the invention may be loaded into a C130 transport.

Figure 2B:
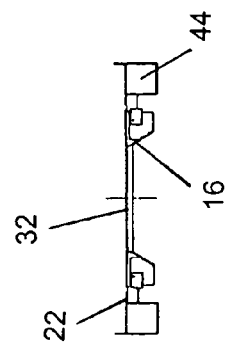
FIG. 2B is a side view, partly in phantom, of a loading bar consistent with the present invention.
Figure 2D:
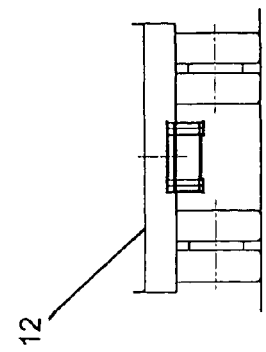
FIG. 2D is a front view of a bogey unit consistent with the present invention.
Figure 2A:
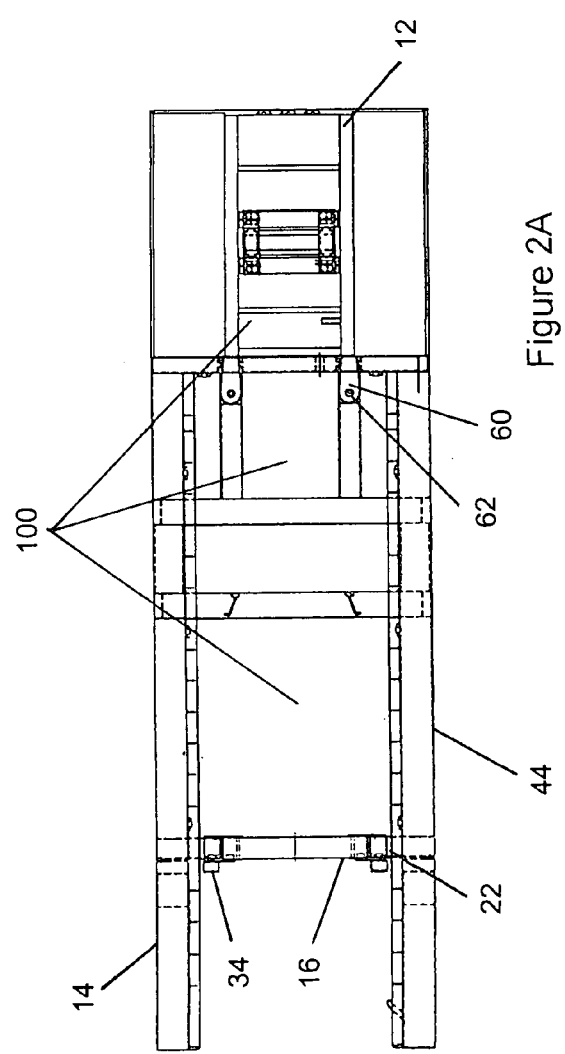
FIGS. 2A and 2C are respectively top and side views, partly in phantom, of a trailer unit consistent with the present invention.
Figure 2C:
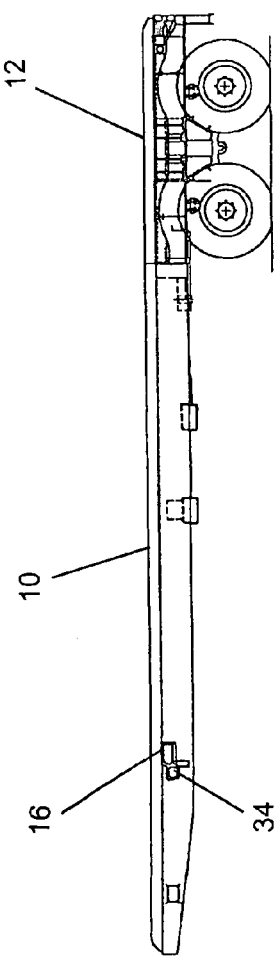
Figure 5C:
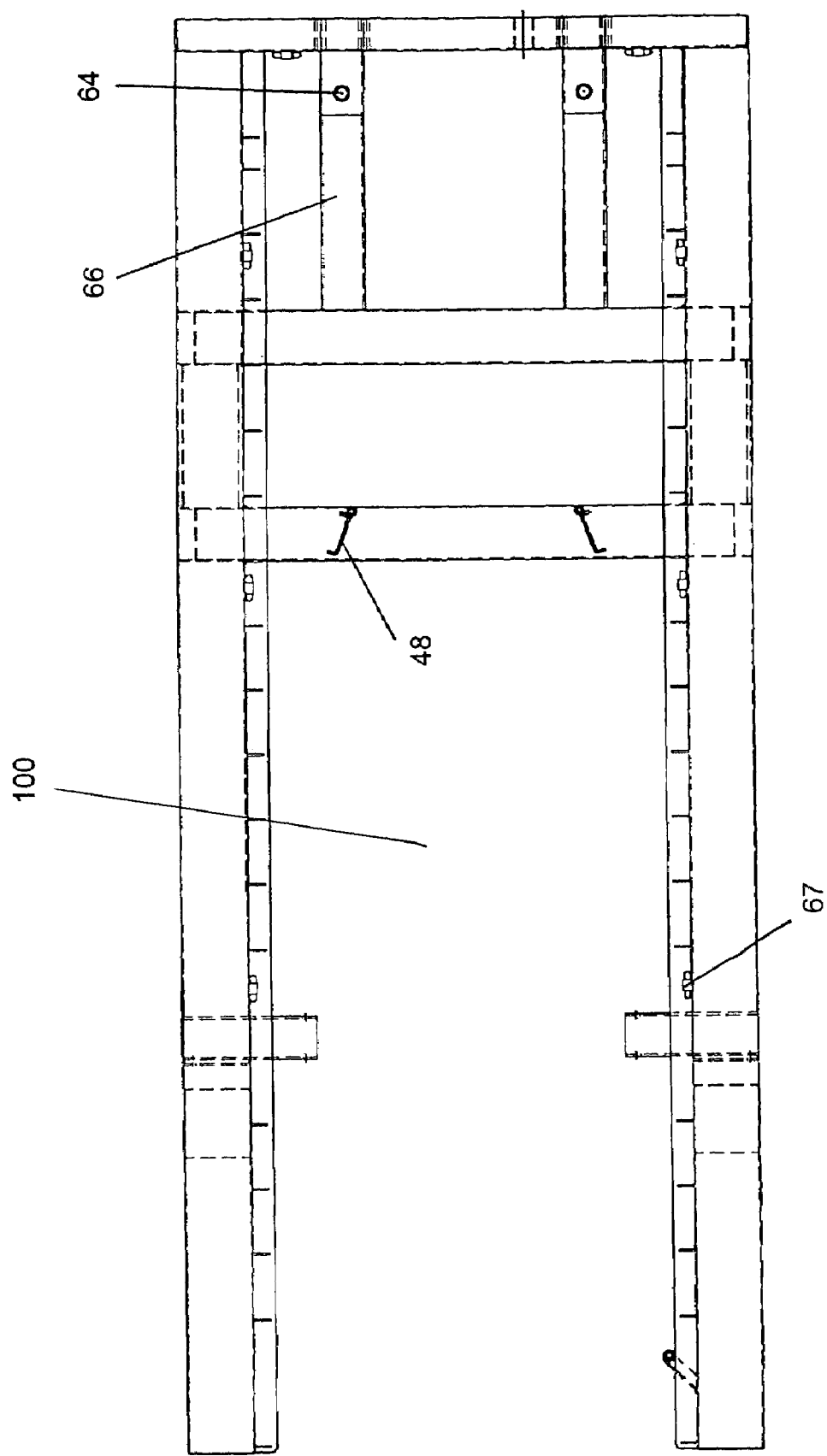
FIG. 5C shows a top view, partly in phantom, of a high mobility trailer frame consistent with the present invention.
Figure 6:
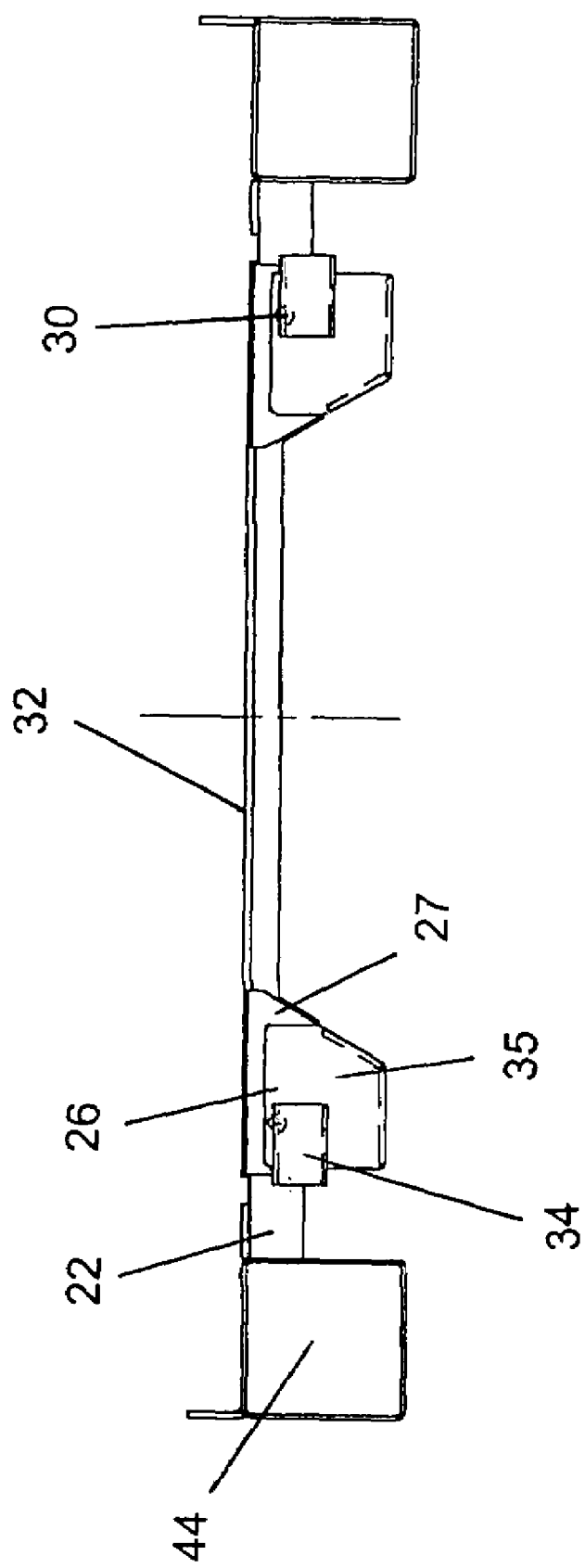
FIGS. 6 shows, partly in phantom, a lifting bar, consistent with the present invention, in position.

In one embodiment of the invention, and with reference to FIGS. 2A and 2B, a lifting bar 16 is present on the frame 14. The lifting bar 16 is attached to the mainframe 14 by a lifting bar mount 22. The lifting bar mount 22, as shown in FIG. 5A, may extend from an interior surface of the mainframe 14. For example, the lifting bar mount 22 may be present on opposing sides of the mainframe 14 such that they extend toward each other.

Figure 3A:
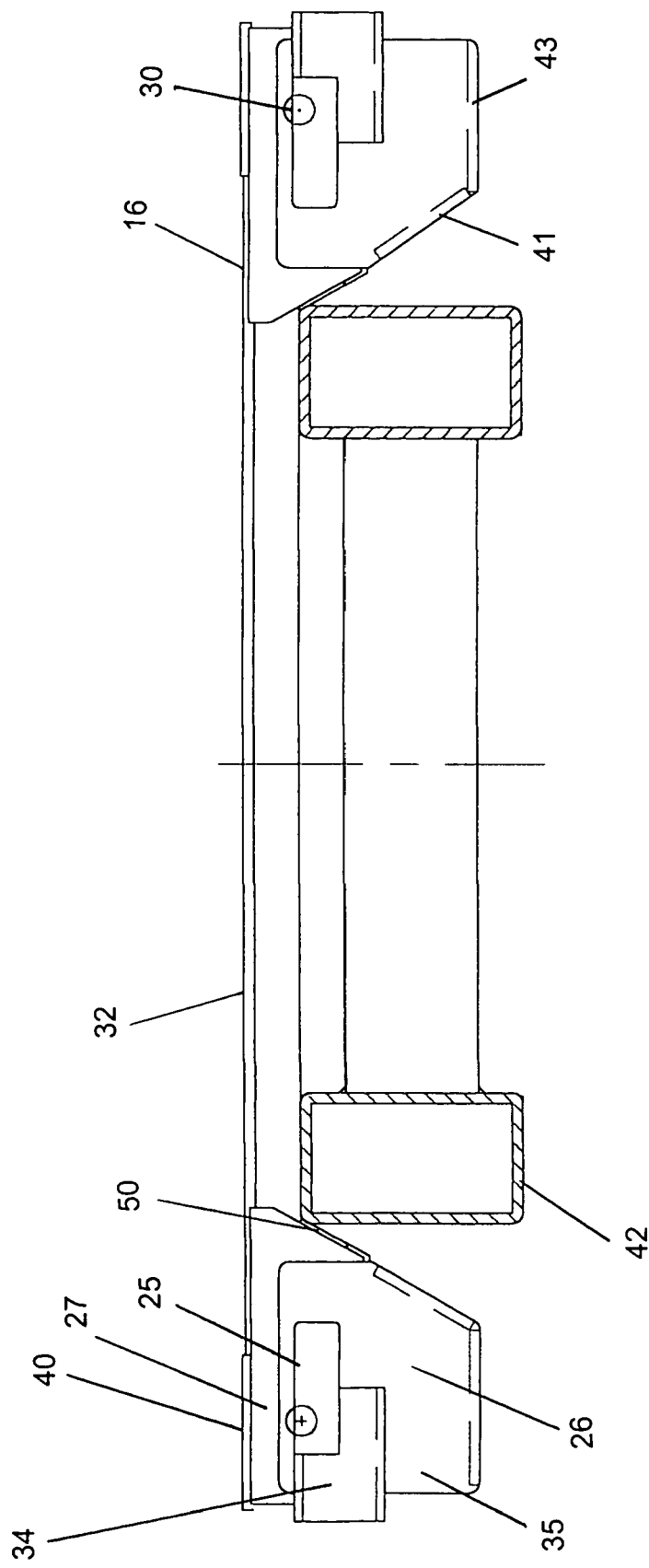
FIG. 3A is a side view, partly in phantom, of a lifting bar associated with hitch boom legs consistent with the present invention.
Figure 3B:
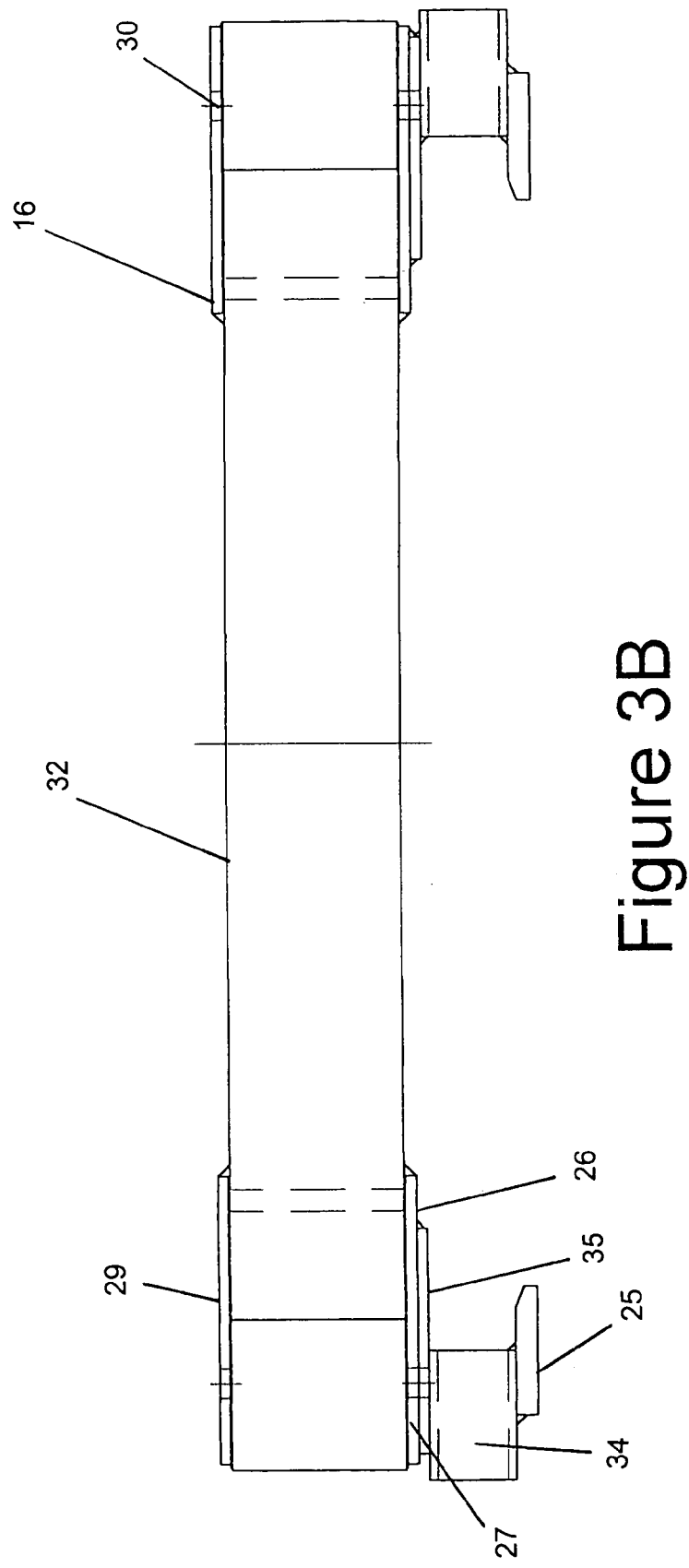
FIG. 3B is a top view, partly in phantom, of a lifting bar consistent with the present invention.
Figure 3C:
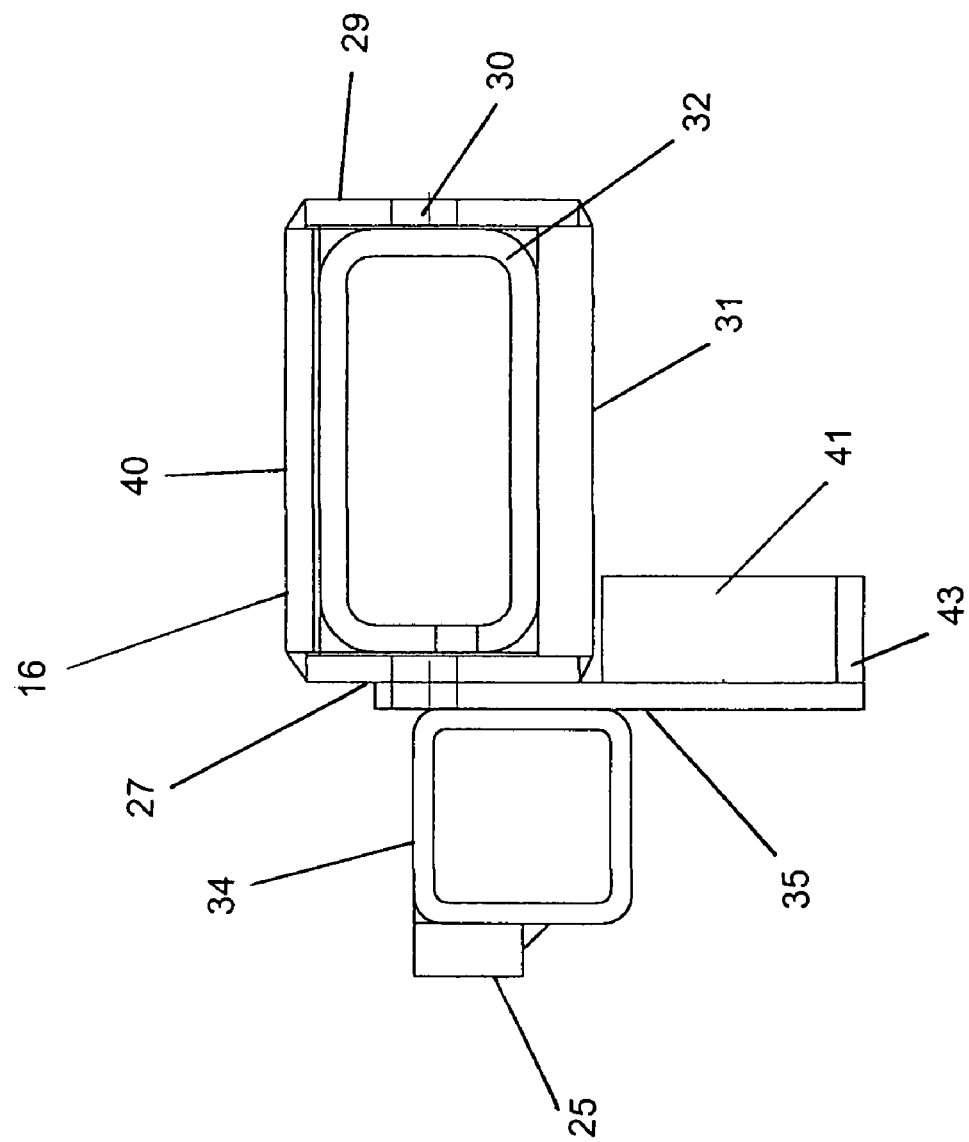
FIG. 3C is an end view, partly in phantom, of a lifting bar consistent with the present invention.
Figure 4B:
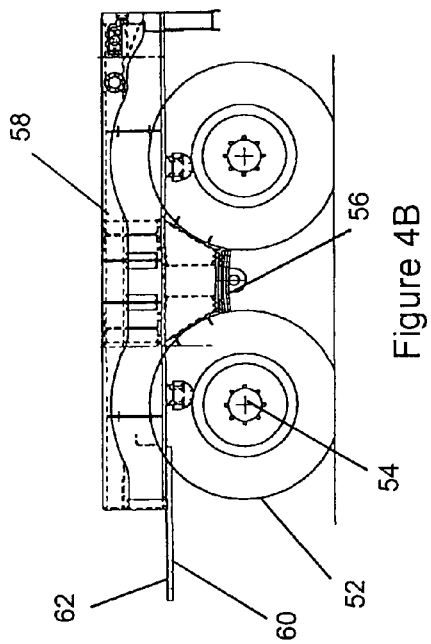
FIGS. 4A through 4D respectively show a partial front view, a side view partly in phantom, a top view partly in phantom, and a partial rear view of a rear bogey assembly consistent with the present invention.
Figure 4D:
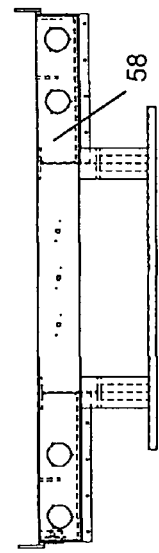
Figure 4A:
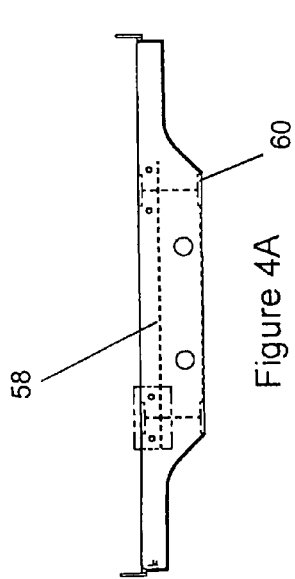
Figure 4C:
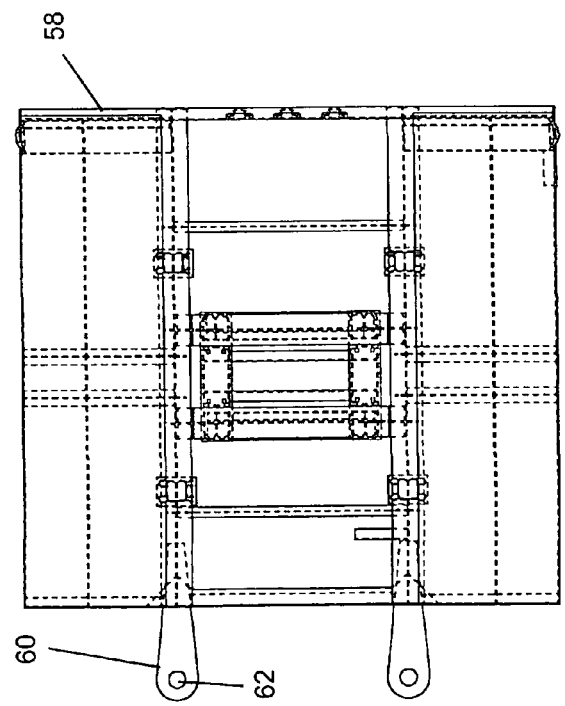

The lifting bar 16, in one embodiment of the invention, with reference to FIGS. 3A–3C, has a flange 26 on either side of a contact bar 32. The flange 26 may be coupled to the mount 22 by such things as a pin. The pin (not shown) passes through a hole 30 in the lifting bar flange 26 and then through an aperture 28 (shown in FIG. 5A) in the lifting bar mount 22. The flange 26 as shown in FIGS. 3A–3C may include a first plate 27 and a second plate 29 attached to the bar 32. A bottom plate 31 and a top plate 40 may be welded across the span between the two plates as shown in FIG. 3C. The lifting bar flange 26 may be constructed such that the contact bar 32 is intermediate the first plate 27 and the second plate 29 of the flange 26. The first plate 27 and the second plate 29 may be attached to the contact bar 32 by, for example, welding. As shown in FIGS. 3A and 3B, the contact bar 32 may not extend the full width of the plates 27, 29, thus leaving portions of the plates 27, 29 to extend beyond the overall length of the contact bar 32.

The contact bar 32 may be configured in a square, rectangular, circular, elliptical, and/or other advantageous shape. The contact bar 32 is preferably formed of materials such as metal, and/or composite material. For example the contact bar 32 may be made of steel or steel alloys.

Attached to the flange 26, for example, to the first plate 27 is a pin socket 34 which receives a fastener (not shown). The pin socket 34 may also be attached, as shown in FIGS. 3A–3C, to an extension plate 35. The extension plate is attached to the first plate 27. In one embodiment of the invention, the pin socket has a fastener guide 25 which provides a surface that aids in aligning the fastener with pin socket 34. The pin socket 34 is configured to be connected by the fastener to the hitch assembly 18 via a hitch pin socket 36 as shown in FIGS. 1A and 1B. For example, as shown in FIG. 3C, the pin socket 34 is positioned on the extension plate 35 and first plate 27 such that a fastener passage through the pin socket 34 has a horizontal orientation. In operation, as shown in FIGS. 1A and 1B, the fastener extends through the pin socket 34 and through the hitch pin socket 36.

The hitch assembly 18, in one embodiment of the invention, has a pair of engagement legs 42 that slidingly engage with the frame rails 44. It should be noted that the overall length of the tractor/trailer combination may be adjusted by lengthening or shortening the engagement legs 42. For example, the engagement legs 42 may slide outwardly, in a telescoping manner, as shown in FIGS. 1A and B and be secured with a securing device, such as a pin (not shown) fitted into one of a plurality of holes in the engagement leg 42. The engagement legs 42 pass under the lifting bar 16 until the ends of the legs 42 reach a cross member 46 which extends between the rails 44. The cross member 46, in one configuration, has a pair of angled guides 48. The angled guides 48 are advantageously positioned to make contact with engagement legs 42 as the engagement legs reach the cross member 46. The contact of the angled guides 48 may act to provide tension on the engagement legs 42 by, for example, a camming action. As shown in FIG. 3A, the engagement legs 42 are positioned such that they are in contact with the contact bar 32 and/or pads 50 present on the flange 26. The engagement legs may be guided into position through contact with an edge of the extension plate 35 and a surface of guide plate 41 which is attached to the extension plate 35. The attachment between extension plate 35 and guide plate 41 is secured with support plate 43. The pads 50 and lifting bar 32 support the weight of the trailer when operatively engaged to the hitch assembly 18. The engagement legs 42, pin socket 34 and the hitch pin socket 36 may be positioned in alignment such that a pin (not shown) may be used to operatively connect the trailer 10 to the hitch assembly 18.

A bogey assembly 12 can selectively attach to the rear of the mainframe 14 to provide easy transport of the trailer 10. The bogey unit 12, in one embodiment of the invention, has wheels 52 mounted to axles 54. The axles may be mounted to suspension system 56, which in turn is fixed to the bogey frame 58. The bogey frame 58 has an attachment extension 60 having a connection structure defined by holes 62. A pin 64 present on the mainframe 14 passes through a hole 62. The mainframe 14 has a bogey connection cross-beam 66 which defines a pin 64. It should be understood, that the bogey unit 12 is designed to be of a modular nature, wherein bogey units 12 having different wheel or axle configurations may be swapped out for one another. For example, a bogey unit 12 having three axles may be swapped out for a bogey unit having two axles and low ground pressure tires.

In one embodiment of the invention, as shown in FIG. 5B, a plurality of attachment points are provided. For example, D-rings 67 may be fixed to various portions of the trailer 10 in order to provide attachment points for equipment securing materials such as chains, cables, ropes, strapping, and/or netting.

In one embodiment of the invention the trailer 10 is configured with, for example, openings 100 in order to survive and/or minimize the effects of a blast, for example, a blast produced by a high explosive such as dynamite wherein energy is released relatively instantaneously. The energy released in such a manner produces a shock wave, which may travel faster than the speed of sound. Typically explosions which produce shock waves travelling faster than the speed of sound are termed detonations, and explosions which produce slower moving shock waves are termed deflagrations. Both types of shock waves can produce extensive damage to equipment. The openings 100 in the trailer may be advantageously positioned such that the surface area coming in contact with a shock wave is minimized.

Figure 7A:
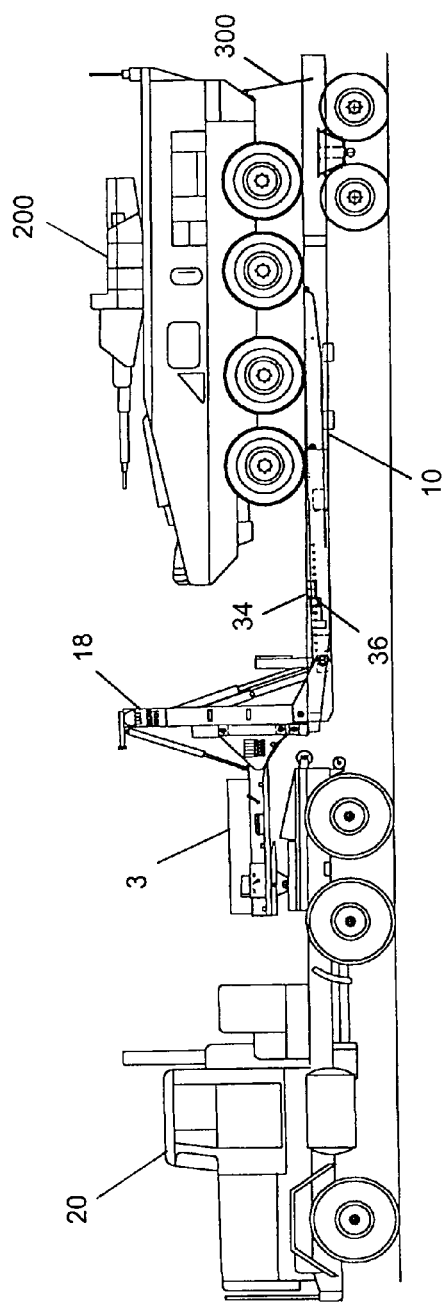
FIGS. 7A and 7B are side elevational views, partly in phantom, showing a truck, trailer, and equipment assembly, consistent with the present invention, in both the assembled and loading configurations, respectively.
Figure 7B:
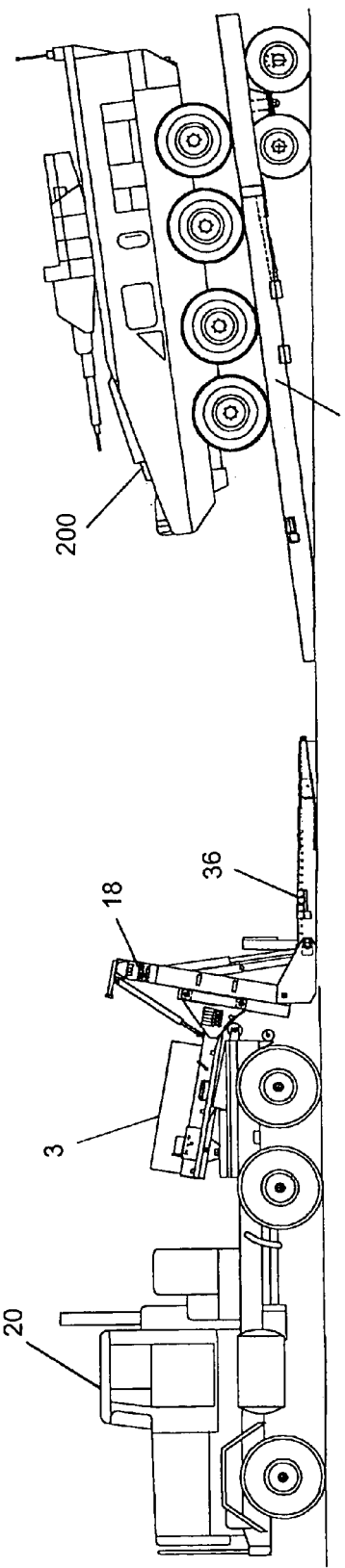

While the dimensions and capacities of the trailer 10 and its associated component may vary greatly depending on the intended use, in one embodiment of the present invention the trailer 10 has a capacity of about 24 tons. The height is about 30 to about 44 inches, the width is about 96 to about 104 inches, the adjustable load length is about 26 to about 46 feet. In addition, the trailer may have common components with various military trailers. For example, as shown in FIGS. 7A and 7B, the trailer 10 can, in some configurations, transport such equipment as Bradley fighting vehicles, artillery rocket systems, interim armored vehicles, medium armored vehicles (MAVs) 200, light armored vehicles (LAVs), and armored amphibious assault vehicles. This equipment can be coupled to the trailer 10 by binding elements such as cable 300 or chains. In addition, the trailer can, in some embodiments, be transported by a C-17 aircraft.

While preferred embodiments of the foregoing invention have been set forth for the purpose of illustration, the foregoing description should not be deemed a limitation of the invention herein. Accordingly, various modifications, adaptations and alternatives may occur to one of skilled in the art without departing from the spirit and scope of the present invention.

The invention claimed is:

1. A high mobility trailer comprising:
   a main frame having a pair of frame rails, a lifting bar mount, a cross beam extending between the pair of frame rails which includes a guide surface configured to receive an engagement leg, and a bogey unit attachment;
   a lifting bar having a contact bar and a pair of flanges engaged with the lifting bar mount, said flanges being fixed to opposing ends of a said contact bar, said flanges each including a pin socket; and
   a bogey unit fixed to the bogey unit attachment, said bogey unit having at least one wheeled axle.

2. The high mobility trailer of claim 1, wherein each flange comprises a first plate having a top surface, a side surface and a bottom surface, and a second plate having a top surface, a side surface and a bottom surface; said first plate and said second plate are attached by a top plate fixed to the first plate top surface and the second plate top surface, a bottom plate fixed proximate to the first plate bottom surface and the second plate bottom surface, and a side plate fixed proximate to the first plate side surface and the second plate side surface; and said lifting bar is fixed to each flange at a location between each first plate and second plate.

3. The high mobility trailer of claim 1, wherein the lifting bar mount extends from an inward surface of the frame rail, said lifting bar mount includes a mount passage which is configured to selectively align with a flange passage in the flange such that a lifting bar retaining pin can be received in the flange passage and the mount passage.

4. The high mobility trailer of claim 1, wherein said lifting bar flanges are each configured to engage with the lift bar mount.

5. A high mobility trailer comprising:
   a main frame having a pair of frame rails, a lifting bar mount, a cross beam extending between the pair of frame rails which includes a guide surface and a bogey unit attachment;
   a lifting bar having a contact bar and a pair of flanges engaged with the lifting bar mount, said flanges being fixed to opposing ends of said contact bar, said flanges each including a pin socket;and
   a bogey unit fixed to the bogey unit attachment, said bogey unit having at least one wheeled axle, wherein said lifting bar flanges are each configured to engage with the lift bar mount.

6. A high mobility trailer comprising:
   a main frame having a pair of frame rails, a lifting bar mount, a cross beam extending between the pair of frame rails which includes a guide surface and a bogey unit attachment;
   a lifting bar having a contact bar and a pair of flanges engaged with the lifting bar mount, said flanges being fixed to opposing ends of said contact bar, said flanges each including a pin socket; and
   a bogey unit fixed to the bogey unit attachment, said bogey unit having at least one wheeled axle, wherein the lifting bar mount extends from an inward surface of the frame rail, said lifting bar mount includes a mount passage which is configured to selectively align with a flange passage in the flange such that a lifting bar retaining pin can be received in the flange passage and the mount passage.

7. The high mobility trailer of claim 6, wherein said lifting bar flanges are each configured to engage with the lift bar mount.

8. A high mobility trailer frame comprising:
   a pair of transversely spaced rails having a forward portion and a rearward portion;
   a hitch engagement which includes a lifting bar fixed to the forward portion of the rails, a cross beam fixed to the rails at a position rearward from the lifting bar, said cross beam having a leg guide.

9. The high mobility trailer frame of claim 8, wherein said hitch engagement further includes an engagement leg engaged with a lower surface of the lifting bar, an upper surface of the cross beam, and the leg guide.

10. The high mobility trailer frame of claim 8, wherein the hitch engagement further includes a pin socket fixed to the lifting bar.

11. The high mobility trailer frame of claim 10, wherein the hitch engagement further includes an engagement leg engaged with a lower surface of the lifting bar, an upper surface of the cross beam, and the leg guide, said engagement leg having a hitch pin socket which is coupled to the pin socket by a pin.

12. The high mobility trailer frame of claim 8, wherein the lifting bar comprises an engagement beam having a first end and a riser extension fixed to the engagement beam first end, said riser extension having a plurality of rail engagement surfaces.

13. The high mobility trailer frame of claim 12, wherein the plurality of rail engagement surfaces define holes.

14. The high mobility trailer frame of claim 8, wherein the rails have a lifting bar mounting surface configured to engage with the lifting bar.

15. The high mobility trailer frame of claim 8, wherein the frame has a plurality of D-rings.

16. The high mobility trailer frame of claim 8, wherein the frame has openings configured to allow rapid passage of a shock wave associated with an explosion between an area below the frame and an area above the frame.

17. The high mobility trailer frame of claim 8, wherein the frame is supporting an armored military vehicle and at least one binding element couples the armored military vehicle to the frame.

18. The high mobility trailer frame of claim 8, wherein the frame is coupled to a hitch assembly having a pair of engagement legs.

19. The high mobility trailer frame of claim 18, wherein an overall length of the trailer frame engaged with a hitch assembly can be adjusted by adjusting a the length of said engagement legs.

* * * * *

UNITED STATES PATENT AND TRADEMARK OFFICE
CERTIFICATE OF CORRECTION

| | | |
|---|---|---|
| PATENT NO. | : 7,156,591 B2 | Page 1 of 1 |
| APPLICATION NO. | : 10/971168 | |
| DATED | : January 2, 2007 | |
| INVENTOR(S) | : Marola | |

It is certified that error appears in the above-identified patent and that said Letters Patent is hereby corrected as shown below:

Column 6:

Line 16, after "of" delete "a".

Column 8:

Line 25, after "adjusting" delete "a".

Signed and Sealed this

Fourteenth Day of August, 2007

JON W. DUDAS
*Director of the United States Patent and Trademark Office*